US011301682B2

(12) United States Patent
Matsushita et al.

(10) Patent No.: US 11,301,682 B2
(45) Date of Patent: Apr. 12, 2022

(54) INFORMATION PROCESSING METHOD, INFORMATION PROCESSING DEVICE, AND COMPUTER-READABLE NON-TRANSITORY STORAGE MEDIUM STORING PROGRAM

(71) Applicant: Mercari, Inc., Tokyo (JP)

(72) Inventors: Nisho Matsushita, Tokyo (JP); Kohei Arai, Tokyo (JP)

(73) Assignee: Mercad, Inc., Tokyo (JP)

( * ) Notice: Subject to any disclaimer, the term of this patent is extended or adjusted under 35 U.S.C. 154(b) by 0 days.

(21) Appl. No.: 16/943,258

(22) Filed: Jul. 30, 2020

(65) Prior Publication Data

US 2021/0034874 A1 Feb. 4, 2021

(30) Foreign Application Priority Data

Aug. 1, 2019 (JP) .............................. JP2019-142241

(51) Int. Cl.
*G06K 9/00* (2006.01)
*G06T 7/62* (2017.01)
*G06T 7/70* (2017.01)

(52) U.S. Cl.
CPC ............ *G06K 9/00671* (2013.01); *G06T 7/62* (2017.01); *G06T 7/70* (2017.01); *G06T 2207/20081* (2013.01)

(58) Field of Classification Search
CPC ... G06T 7/70; G06T 7/62; G06T 2207/20081; G06K 9/6211; G06K 9/00208; G06K 9/00671
See application file for complete search history.

(56) References Cited

U.S. PATENT DOCUMENTS 5,315,666 A * 5/1994 Norton-Wayne .... G01B 11/024
382/111
10,679,046 B1 * 6/2020 Black ...................... G06T 17/00
(Continued)

FOREIGN PATENT DOCUMENTS

JP H02-110307 A 4/1990
WO WO 2014084181 A1 6/2014

OTHER PUBLICATIONS

NTC Co., Ltd., "mysizeis Clothes" <https://mysizeis.jp/clothes>, Jul. 1, 2020.

*Primary Examiner* — Syed Haider
(74) *Attorney, Agent, or Firm* — Sterne, Kessler, Goldstein & Fox P.L.L.C.

(57) ABSTRACT

A clothing item being captured is appropriately measured without requiring a dedicated sheet of paper or the like. An information processing method is performed by one or more processors included in an information processing device, the method including acquiring, from a memory, image data including a clothing item being captured; detecting a reference plane including the clothing item; transmitting the image data to an other information processing device; acquiring, from the other information processing device, each piece of coordinate data, in an image coordinate system, indicating each measured point regarding a size of the clothing item included in the image data, the coordinate data being obtained as a result of image processing on the image data; projecting and plotting, on the reference plane, each measured point indicated by each piece of coordinate data in the image coordinate system; calculating, in relation to each measured point in a three-dimensional coordinate system plotted on the reference plane, a distance between predetermined two points, the distance indicating the size of the clothing item; and performing control such that the (Continued)

distance between the predetermined two points that is calculated is displayed on the image data being captured.

13 Claims, 14 Drawing Sheets

(56) References Cited

U.S. PATENT DOCUMENTS

| | | | | |
|---|---|---|---|---|
| 2011/0142335 A1* | 6/2011 | Ghanem | ............. | G06K 9/6215 |
| | | | | 382/165 |
| 2011/0202165 A1* | 8/2011 | Tokura | ..................... | D05C 5/06 |
| | | | | 700/138 |
| 2015/0003690 A1* | 1/2015 | Masuko | .................. | G06T 11/60 |
| | | | | 382/111 |
| 2016/0292888 A1* | 10/2016 | Arita | .................... | G01B 11/002 |

* cited by examiner

Fig. 4

| CLOTHING ITEM ID | CATEGORY | 0 | 1 | 2 | ... |
|---|---|---|---|---|---|
| T-000100 | SHIRT | (u0,v0),(x0,y0,z0) | (u1,v1),(x1,y1,z1) | (u1,v1),(x1,y1,z1) | ... |
| ... | ... | ... | ... | ... | ... |

Fig. 5

| CLOTHING ITEM ID | CATEGORY | LENGTH | CHEST WIDTH | SLEEVE LENGTH | ... |
|---|---|---|---|---|---|
| T-000100 | SHIRT | 67.7cm | 48.3cm | 27.9cm | ... |
| ... | ... | ... | ... | ... | ... |

Fig. 6

| CATEGORY | MODEL | KEYPOINT 0 | KEYPOINT 1 | KEYPOINT 2 | ... |
|---|---|---|---|---|---|
| SHIRT | M1 | (um0,vm0) | (um1,vm1) | (um2,vm2) | ... |
| TROUSERS | M2 | ... | ... | ... | ... |
| SKIRT | M3 | ... | ... | ... | ... |
| ... | ... | ... | ... | ... | ... |

INFORMATION PROCESSING METHOD, INFORMATION PROCESSING DEVICE, AND COMPUTER-READABLE NON-TRANSITORY STORAGE MEDIUM STORING PROGRAM

BACKGROUND OF THE INVENTION

Field of the Invention

The present disclosure relates to an information processing method, an information processing device, and a computer-readable non-transitory storage medium storing a program.

Description of the Related Art

These days, to list an article, for example a clothing item such as clothes, a toy, a daily use article, or furniture such as a sofa, on a Customer-to-Customer (CtoC) marketplace or an electronic commerce (EC) site, a seller presents the size of the clothing item or the like by including the same in listing information. For example, the seller actually measures the size of the clothing item or checks the size given in a catalog published by the manufacturer of the clothing item, and presents the size as listing information. For example, as a method for saving the trouble, there is disclosed a technique of automatically measuring a clothing size when a clothing item is flatly placed on a dedicated sheet of paper and photographed (for example, see Non-Patent Literature 1).

CITATION LIST

Non-Patent Literature

[Non-Patent Literature 1]
NTC Corporation, "mysizeis Clothes", [online], [searched on Jul. 29, 2019], Internet <https://mysizeis.jp/clothes>

SUMMARY OF THE INVENTION

However, with the measuring technique described above, a dedicated sheet of paper has to be prepared, and measurement of a clothing item cannot be performed if there is no dedicated sheet of paper for flatly placing the clothing item.

An object of the present disclosure is to provide an information processing method, an information processing device, and a computer-readable non-transitory storage medium storing a program, with which an article, such as a clothing item, being captured may be appropriately measured without requiring a dedicated sheet of paper or the like.

An information processing method according to an embodiment of the present disclosure is performed by one or more processors included in an information processing device, the method including: acquiring, from a memory, image data including a clothing item being captured; detecting a reference plane including the clothing item; transmitting the image data to an other information processing device; acquiring, from the other information processing device, each piece of coordinate data, in an image coordinate system, indicating each measured point regarding a size of the clothing item included in the image data, the coordinate data being obtained as a result of image processing on the image data; projecting and plotting, on the reference plane, each measured point indicated by each piece of coordinate data in the image coordinate system; calculating, in relation to each measured point in a three-dimensional coordinate system plotted on the reference plane, a distance between predetermined two points, the distance indicating the size of the clothing item; and performing control such that the distance between the two points that is calculated is displayed on the image data being captured.

According to the disclosed technique, an article, such as a clothing item, being captured may be appropriately measured without requiring a dedicated sheet of paper or the like.

BRIEF DESCRIPTION OF THE DRAWINGS

FIG. 4 shows an example of keypoint data included in clothing item data 133 according to the first embodiment;

FIG. 5 is a diagram showing an example of size information of a clothing item included in the clothing item data 133 according to the first embodiment;

FIG. 6 is a diagram showing an example of a learned model 234 according to the first embodiment;

DETAILED DESCRIPTION OF THE PREFERRED EMBODIMENTS

Hereinafter, an embodiment of the present disclosure will be described in detail with reference to the drawings. Additionally, same elements will be denoted by a same reference sign, and overlapping description thereof will be omitted.

First Embodiment

In a first embodiment, a device or a system for appropriately measuring a clothing item by capturing a clothing item that is placed on a floor, a desk or the like and that is kept still will be described. In the first embodiment, a learned model that is learned using image data including a clothing item as a learning data and each measured point (keypoint) regarding the size of a clothing item as teaching data is prepared. Each keypoint is an end point of a corner of a cuff, an end point of a seam between a sleeve and a body, an end point of a collar, or the like. Furthermore, in the first embodiment, measurement is appropriately performed by each keypoint of a clothing item being calculated from image data being captured, and by a distance between two points regarding the size being calculated.

<Example Application of System>

Figure 1:
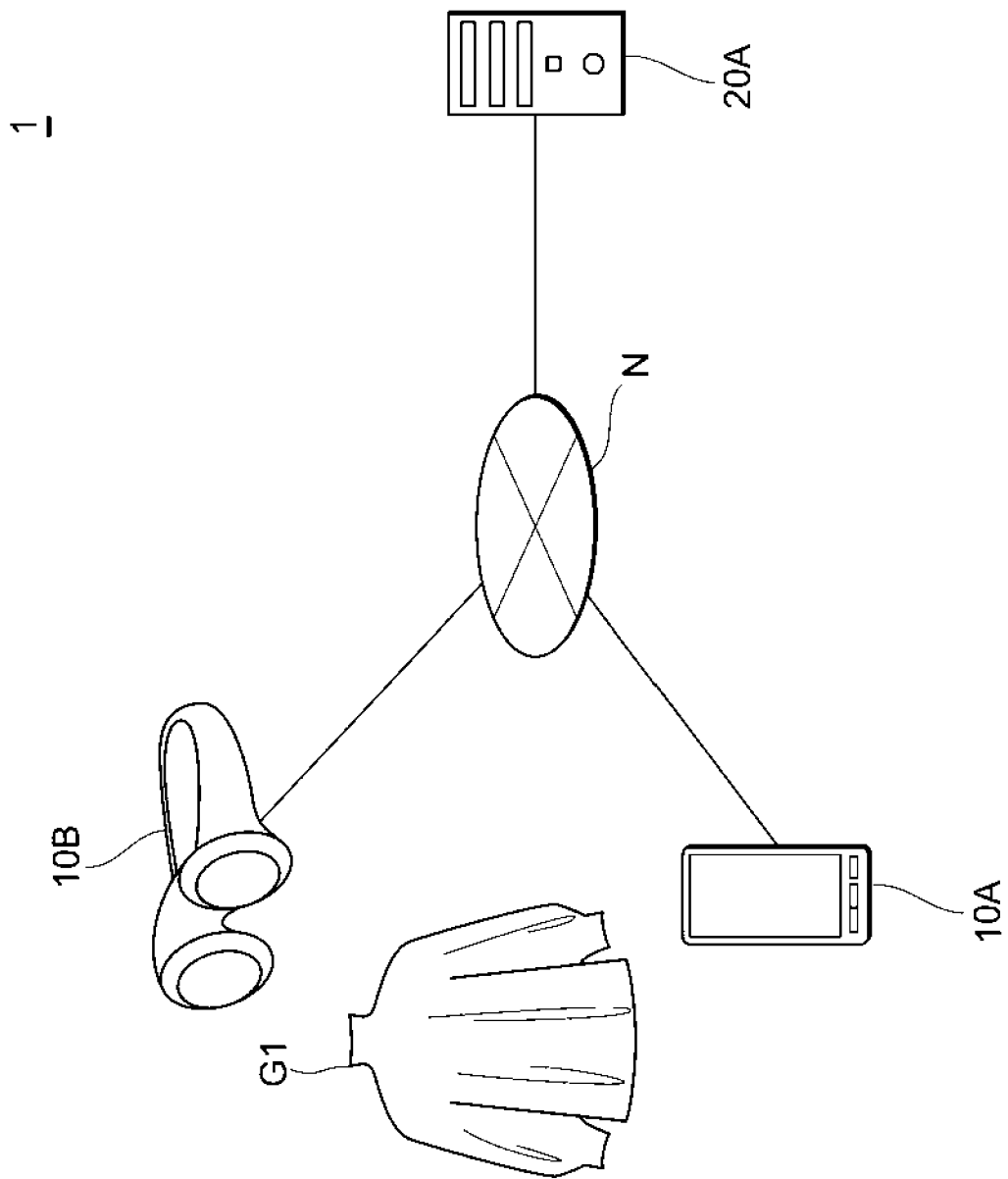
FIG. 1 is a diagram showing an example of each structure of an information processing system 1 according to a first embodiment.

FIG. 1 is a diagram showing an example of each structure of an information processing system 1 according to the first embodiment. In the example shown in FIG. 1, information processing devices 10A, 10B to be used by a user, and a server 20A for performing image processing on image data including a clothing item are connected via a network N. Additionally, it suffices that the user uses one of the information processing devices 10A, 10B, and the information processing system 1 does not necessarily have to include both of the information processing devices 10A, 10B.

For example, the information processing device 10A is a smartphone, a mobile phone (feature phone), a computer, a personal digital assistant (PDA) or the like, and includes a built-in or external capturing device.

For example, the information processing device 10B is a wearable terminal (such as, but not limited to, an eyewear device). Additionally, a term "information processing device 10" will be used when not distinguishing between the information processing devices 10A and 10B. The information processing device 10 is a terminal that is used by a user, and may also be referred to as a user terminal 10.

For example, the information processing device 20A is a server, and may be composed of one or more devices. Moreover, the information processing device 20A acquires image data including a clothing item and performs image processing, and acquires coordinate data of each feature (keypoint) for measuring the clothing item. In the following, the information processing device 20A may also be referred to as a server 20.

In the example shown in FIG. 1, the user terminal 10 captures a clothing item G1, and transmits one piece of image data being captured to the server 20. For example, the server 20 includes a learned model learned using a plurality of pieces of clothing-item image data as teaching data. Specifically, the server 20 generates the learned model in advance by performing machine learning, taking pieces of clothing-item image data including various types of clothing items such as shirts, slacks (trousers) and skirts as learning data, and using keypoints for measurement (such as both end points indicating a length, both end points indicating a chest width, both end points indicating a shoulder width, or both end points indicating a sleeve length) as ground truth labels of each piece of learning data.

The server 20 may thus use the learned model on a new data set, of image data including a clothing item, transmitted from the user terminal 10, and acquire each keypoint in the image data including a clothing item by using the learned model. For example, coordinate data in an image coordinate system of the image data is acquired for each keypoint.

Furthermore, the server 20 may perform object recognition or pattern matching on received image data and detect a category of a clothing item, such as a shirt, and determine each key point associated with the category of the clothing item, for example.

The server 20 transmits the coordinate data of each determined keypoint to the user terminal 10. The user terminal 10B performs measurement of a clothing item being captured, based on the coordinate data, and acquires the size of the clothing item. For example, when the user terminal 10 superimposes and displays the acquired size of the clothing item on the image data being captured, a user may automatically acquire a measurement result for the clothing item simply by turning a camera to face the clothing item. Additionally, "automatically" means that there is no need to prepare in advance a dedicated sheet of paper or the like necessary for measurement, and a simple user operation of pressing a button to acquire an image may be included in the meaning of "automatically".

<Example Configuration>

Figure 2:
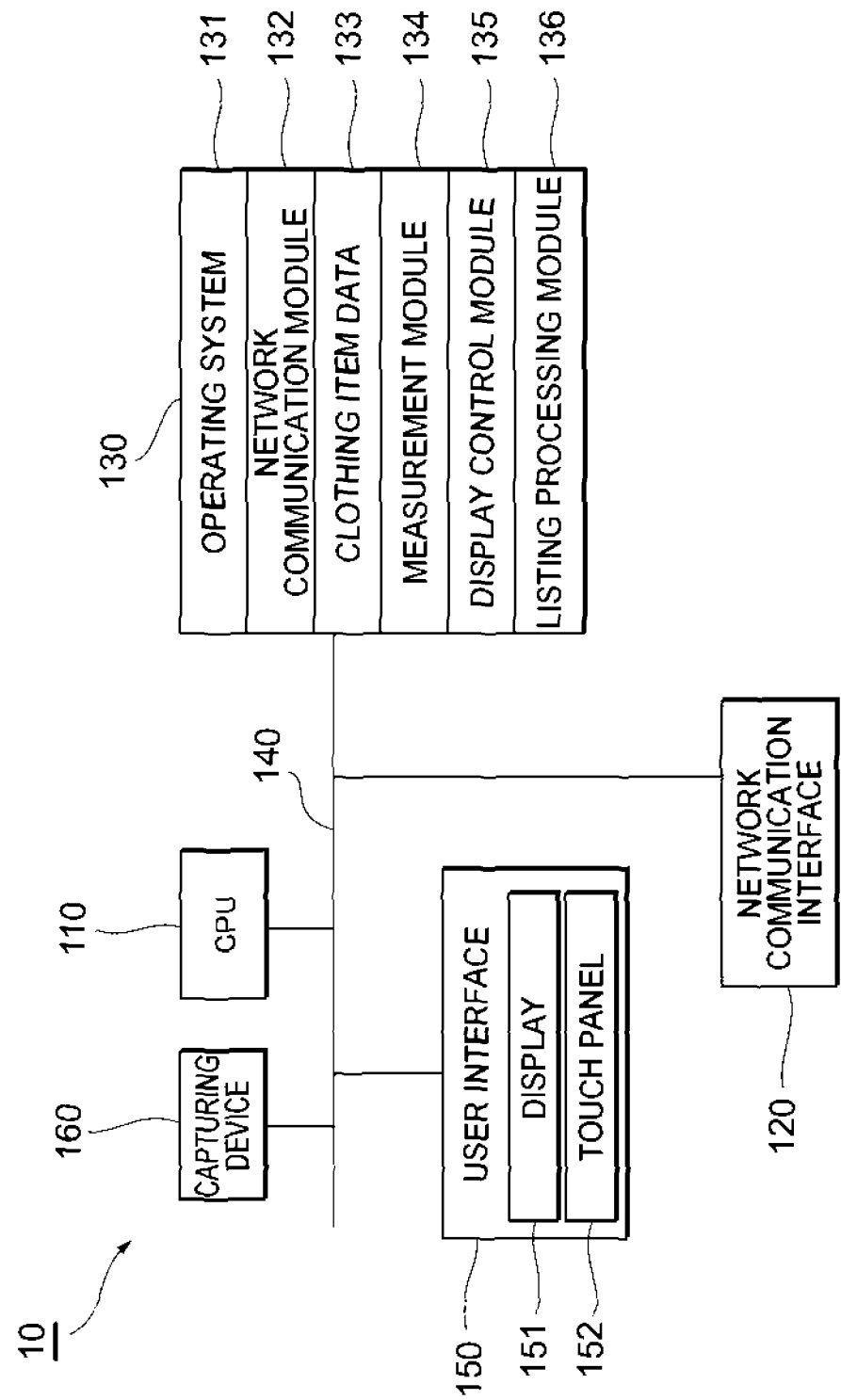
FIG. 2 is a block diagram showing an example of a user terminal 10 according to the first embodiment.

FIG. 2 is a block diagram showing an example of the user terminal 10 according to the first embodiment. The user terminal 10 typically includes one or more processing devices (CPU) 110, one or more network- or other communication interfaces 120, a memory 130, a user interface 150, a capturing device 160, and one or more communication buses 140 for interconnecting the structural elements.

For example, the user interface 150 is a user interface 150 including a display device 151, and a keyboard and/or a mouse (or some other input device such as a pointing device) 152. The user interface 150 may alternatively be a touch panel.

For example, the memory 130 is a high-speed random-access memory such as a DRAM, an SRAM, a DDR RAM or another random-access solid-state storage device, or may be one or more non-volatile memories including magnetic disk storage devices, optical disk storage devices, flash memory devices or other non-volatile solid-state storage devices.

Furthermore, as another example of the memory 130, there may be cited one or more storage devices that are installed remotely from the CPU 110. In an embodiment, the memory 130 stores following programs, modules and data structures, or subsets thereof.

For example, an operating system 131 includes a procedure for processing various basic system services and for executing tasks using hardware.

For example, a network communication module 132 is used to connect the user terminal 10 to another computer via the one or more network communication interfaces 120 and one or more communication networks including the Internet, other wide area networks, local area networks, or metropolitan area networks.

The clothing item data 133 is data about a clothing item that is included in image data being captured (hereinafter referred to also as "clothing item data"), and image data of a clothing item and data about measurement of a clothing item may be included in the clothing item data, for example. The clothing item data will be described later with reference to FIGS. 4 and 5.

A measurement module 134 detects a reference plane including an object. For example, the reference plane is a reference plane in a world coordinate system (three-dimensional coordinate system), and is desirably a flat plane. For example, the measurement module 134 may detect a group of features from a plurality of pieces of image data using a technique such as simultaneous localization and mapping (SLAM), and may detect a reference plane including the features. Alternatively, the measurement module 134 may detect the reference plane using a depth sensor, an infrared ray sensor or the like.

Furthermore, the measurement module 134 transmits one piece of image data being captured to the server 20, and performs an acquisition request for each measured point (keypoint) for measurement. For example, after the acquisition request, the measurement module 134 acquires, from the server 20, each piece of coordinate data, in an image coordinate system, indicating each keypoint obtained as a result of image processing on the image data.

When each piece of coordinate data in the image coordinate system is acquired, the measurement module 134 transforms each piece of coordinate data into data in the three-dimensional coordinate system of the world coordinate system. For example, the measurement module 134 plots, on a detected reference plane (for example, a flat plane on which a clothing item is assumed to be present), a point impinged on the reference plane when coordinate data of each keypoint in the image coordinate system is projected on the reference plane, and takes the point plotted on the reference plane as the coordinate data of each keypoint in the three-dimensional coordinate system (world coordinate system).

Additionally, once detected, the reference plane may be tracked even when a camera position is changed. However, in the case where the camera position is changed after the measurement module 134 transmits image data to the server 20, if a keypoint returned from the server 20 is plotted, a position of a desired keypoint is possibly shifted. Accordingly, the measurement module 134 desirably saves a three-dimensional position of the camera at the time of capturing of image data to be transmitted to the server 20 or parameters at the time of capturing, such as coordinates or rotation of the camera, and the measurement module 134 desirably plots the keypoint based on the three-dimensional position or the like.

The measurement module 134 calculates, in relation to each keypoint in the three-dimensional coordinate system plotted on the reference plane, a distance between two predetermined points indicating the size of a clothing item included in image data. For example, the measurement module 134 may obtain size data of a clothing item by calculating a distance between two keypoints in the three-dimensional coordinate system included in one piece of image data being captured. Identification information, such as a number between 0 and N, is assigned to each keypoint. In this case, if association is made in advance in such a way that a distance between numbers 3 and 4 indicating keypoints indicates a shoulder width, for example, the measurement module 134 may easily measure the size of a clothing item by calculating a distance between predetermined numbers.

A display control module 135 associates the calculated distance (length) between two points with the size of a clothing item corresponding to the two points, and performs control such that the distance is displayed on the image data being captured. For example, the display control module 135 may superimpose a calculated distance, as a size, on a length part, a chest width part, a sleeve length part or the like in the image data, and may perform display in augmented reality (AR) or virtual reality (VR).

A clothing item being captured may thus be appropriately measured without requiring a dedicated sheet of paper or the like.

Moreover, because the display control module 135 uses each keypoint plotted on the reference plane, even if the camera position is changed, the distance between the keypoints may be kept displayed as a size as long as the reference plane is detected. Accordingly, the disclosed technique is clearly different from a technique of displaying a size in captured still image data, and can keep displaying, in AR, in one piece of image data being captured (moving image data), a size that is once calculated, even if the camera position is changed.

Furthermore, the measurement module 134 may acquire specific information about a clothing item included in image data, using at least one of image recognition on the clothing item, user input, and reading of the specific information. The specific information includes information for specifying the category of a clothing item or a product, for example. As described above, the specific information may be acquired by image recognition on a tag of a clothing item, or may be acquired by being input by a user, or may be acquired by reading an IC tag or the like.

At this time, the measurement module 134 may acquire catalog information of the clothing item based on the acquired specific information. For example, the measurement module 134 accesses a database storing a product catalog, and acquires catalog information of a product matching the specific information. Additionally, the catalog information is product information of a clothing item provided by a manufacturer or a seller of the clothing item, and includes information such as the size, the color and the brand, for example.

The display control module 135 may perform control such that a size in the catalog information (hereinafter referred to also as "catalog size") and the size indicated by a calculated distance are displayed in the image data. For example, the display control module 135 performs control such that the catalog size is displayed in the image data, in association with the measured size.

A user may thus grasp how much the measured clothing item is different from the size presented in the catalog information.

Furthermore, the display control module 135 may perform control such that the catalog size and the size that is indicated by a calculated distance are displayed on an image in comparison with each other. For example, the display control module 135 controls display to associate a calculated size and the catalog size for a corresponding item. Furthermore, the display control module 135 may list calculated sizes and catalog sizes, and may control display of the list (for example, see FIG. 11A described later).

A user may thus more appropriately grasp the difference between the size of a measured clothing item and the catalog size.

Furthermore, the display control module 135 may further perform control such that the catalog size and the size indicated by a calculated distance are displayed superimposed on the clothing item in the image data. For example, the display control module 135 may perform control such that the size in the catalog information is displayed superimposed on a position on the actual clothing item in the form of a dotted line (for example, see FIG. 11B described later).

A user may thus more appropriately, visually grasp the difference between the size of a measured clothing item and the catalog size.

Furthermore, in the case where the catalog size and the size indicated by a distance are different at a predetermined part of the clothing item by a predetermined value or more, the display control module 135 may perform control such that the predetermined position is displayed on the image data in an emphasized manner. For example, if a measured size and the catalog size are different by 1 cm or more for a predetermined item (such as a sleeve length or a length), the display control module 135 may perform control such that the predetermined item is displayed in an emphasized manner, by changing the color at the position of the predetermined item or by encircling the predetermined item (for example, see FIG. 11C described later).

A user may thus more easily, visually grasp the difference between the size of a measured clothing item and the catalog size.

Moreover, with the disclosed technique, measurement may be performed in the same manner even when a plurality of clothing items are included in one image. In this case, if a plurality of clothing items are included in image data, the measurement module 134 may detect a reference plane including the plurality of clothing items. Furthermore, the measurement module 134 may perform extraction by dividing into predetermined regions on a per clothing item basis. At this time, the measurement module 134 may assign identification information to each predetermined region.

At the time of acquisition request for a keypoint, the measurement module 134 performs control such that image data of a predetermined region is transmitted to the server 20 in association with the assigned identification information. Each keypoint regarding the size of a clothing item may be acquired from the server 20, for each clothing item included in a predetermined region corresponding to the assigned identification information. Next, the measurement module 134 may project and plot on the reference plane, for each clothing item in each predetermined region, each keypoint indicated by each piece of coordinate data of the clothing item in the image coordinate system.

The measurement module 134 may calculate, for each clothing item in each predetermined region, a distance between two predetermined points indicating a size of the clothing item, in relation to the plotted keypoints in the three-dimensional coordinate system.

At this time, the display control module 135 may perform control, in relation to each clothing item in each predetermined region, such that the calculated distance between two points is displayed, in the image data being captured, in association with the size of the corresponding clothing item.

Measurement may thus be performed at once for a plurality of clothing items, and the burden of performing measurement on a one-by-one basis may be eliminated, and the number of times of communication between the user terminal 10 and the server 20 may be reduced.

Moreover, the user terminal 10 may include a listing processing module 136. The listing processing module 136 may generate listing information by including, in product information of a clothing item, size information of the clothing item including the calculated distance between two points. For example, the listing processing module 136 may include the calculated size information of a clothing item in the product information, as the size information of a clothing item that is to be listed. At this time, if the measurement module 134 managed to acquire size information in the catalog information, the listing processing module 136 may also include information about the catalog size in the listing information, together with information about the measured size.

Accordingly, a user does not have to perform measurement or acquire size information from the catalog information at the time of listing a clothing item, and the burden on the user regarding listing may be eliminated, and the user may be encouraged to perform listing. Furthermore, by also including the size information according to the catalog information, a comparison with a new article may be presented by the listing information.

Additionally, the one or more processing devices (CPU) 110 read out, from the memory 130, and execute each module as necessary. For example, the one or more processing devices (CPU) 110 may form a communication unit by executing the network communication module 132 stored in the memory 130. Furthermore, the one or more processing devices (CPU) 110 may form a measurement unit, a display control unit, and a listing processing unit by executing, respectively, the measurement module 134, the display control module 135, and the listing processing module 136 stored in the memory 130.

In another embodiment, the measurement module 134, the display control module 135, and the listing processing module 136 may be stand-alone applications that are stored in the memory 130 of the user terminal 10. Although not restrictive, a measurement application, a display control application, and a listing processing application may be cited as the stand-alone applications. In further another embodiment, the measurement module 134, the display control module 135, and the listing processing module 136 may be add-ons or plug-ins to other applications.

Each of the elements described above may be stored in one or more of the storage devices mentioned above. Each of the modules described above corresponds to a set of commands for executing the function described above. The module described above or a program (that is, a set of commands) does not have to be implemented as a separate software program, procedure or module, and also, various subsets of these modules may be combined or reconstructed in various embodiments. In an embodiment, the memory 130 may store subsets of the modules described above and data structures. The memory 130 may further store additional modules and data structures not described above.

Figure 3:
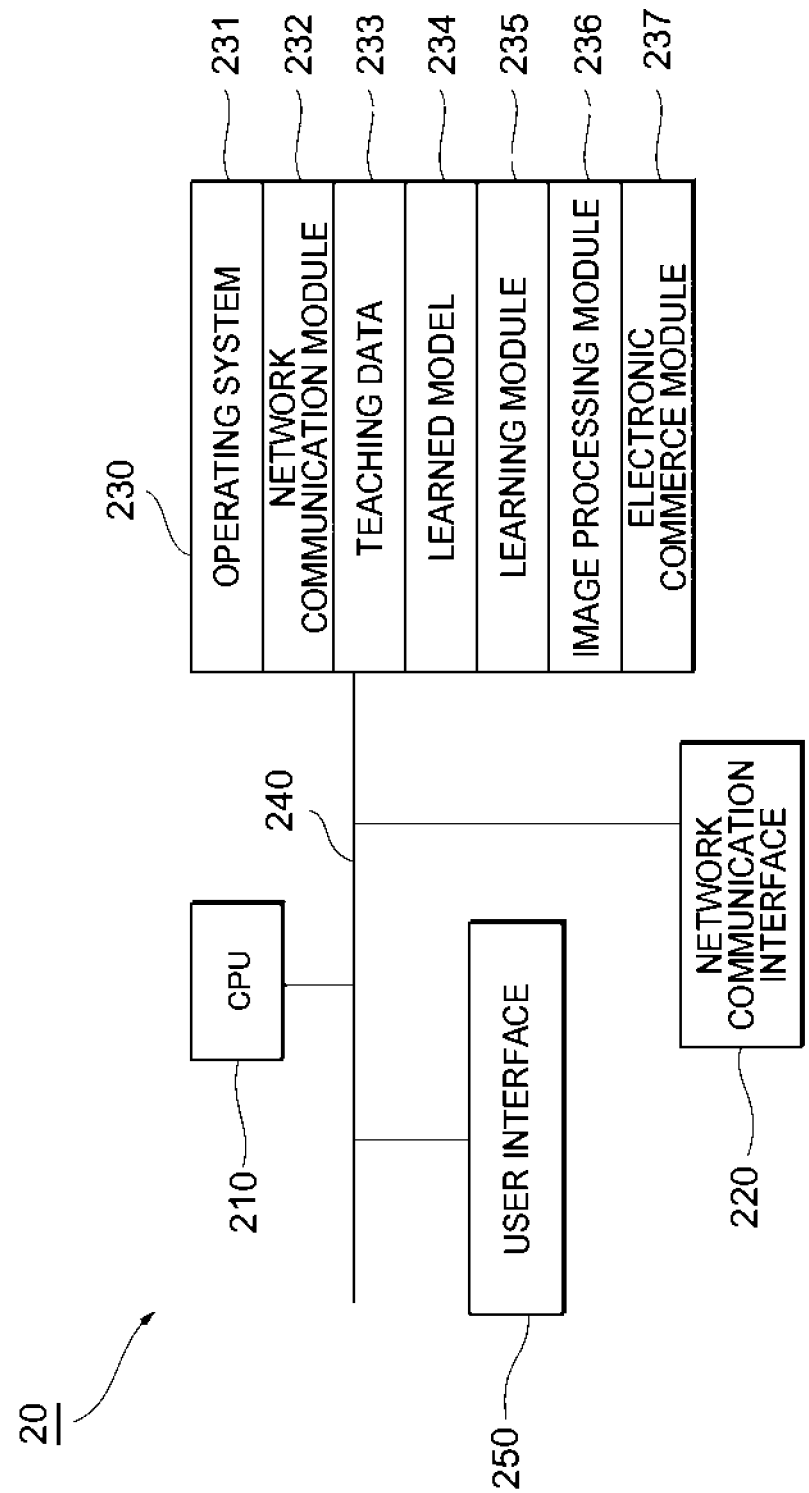
FIG. 3 is a block diagram showing an example of a server 20 according to the first embodiment.

FIG. 3 is a block diagram showing an example of the server 20 according to the first embodiment. The server 20 is typically one or more processing devices (CPU) 210, one or more network or other communication interfaces 220, a memory 230, and one or more communication buses 240 for interconnecting the structural elements.

The server 20 may include a user interface 250 depending on the situation, and as the user interface 250, there may be cited a display device (not shown), and a keyboard and/or a mouse (or some other input device such as a pointing device; not shown).

For example, the memory 230 is a high-speed random-access memory such as a DRAM, an SRAM, a DDR RAM or another random-access solid-state storage device, or may be one or more non-volatile memories including magnetic disk storage devices, optical disk storage devices, flash memory devices or other non-volatile solid-state storage devices.

Furthermore, as another example of the memory 230, there may be cited one or more storage devices that are installed remotely from the CPU 210. In an embodiment, the memory 230 stores following programs, modules and data structures, or subsets thereof.

For example, an operating system 231 includes a procedure for processing various basic system services and for executing tasks using hardware.

For example, a network communication module 232 is used to connect the server 20 to another computer via the one or more network communication interfaces 220 and one or more communication networks including the Internet, other wide area networks, local area networks, metropolitan area networks or the like.

Teaching data 233 is data including learning data indicating image data capturing clothing items in various categories, and a ground truth label indicating each keypoint for measurement of a clothing item included in the image data. For example, the learning data includes image data capturing a clothing item in each category (such as a T-shirt, trousers, skirt, or a long sleeve shirt), and in relation to the ground truth label, a keypoint regarding the size of a clothing item in each category is associated on a per image data basis. The number of keypoints may be different depending on the category of the clothing item.

A learned model 234 is a model learned from the teaching data 233. For example, the learned model 234 is a learned model generated by performing machine learning on the teaching data 233 by a learning module 235 described later. By using this model, data indicating which points are to be measured for which clothing item may be automatically generated. For example, in the case of a sleeve length of a T-shirt, a seam part between the sleeve and the body and a lower sleeve edge are made the keypoints.

For example, the learning module 235 performs machine learning on the teaching data 233. Furthermore, the learning module 235 acquires the learned model 234 for a new data set including one piece of image data capturing a clothing item, performs machine learning using the acquired learned model 234, and specifies each keypoint on the clothing item. The learning module 235 causes each specified keypoint of the clothing item to match on the image data, and specifies coordinate data of each keypoint in the image coordinate system. The learning module 235 transmits each piece of specified coordinate data to the user terminal 10. Additionally, a learning process by the machine learning described above is included in image processing.

An image processing module 236 performs pattern matching, object recognition/detection or the like on one piece of image data capturing a clothing item, to specify the category to which the captured clothing item belongs. An image data group used for comparison includes a large number of pieces of image data capturing clothing items in respective categories. For example, the image processing module 236 extracts image data having a high degree of similarity to image data being captured, and specifies the category that is associated with the extracted image data. The image processing module 236 acquires each keypoint associated with the specified category, matches each keypoint with the image data, and specifies the coordinate data of each keypoint in the image coordinate system. The image processing module 236 transmits each piece of the specified coordinate data to the user terminal 10. Additionally, the image processing module 236 is not necessarily an essential module.

An electronic commerce module 237 performs a buying/selling process regarding products and services. For example, the electronic commerce module 237 performs a listing process for a product or a service, or performs a selling process. Additionally, the electronic commerce module 237 may be implemented by another server.

Each of the elements described above may be stored in one or more of the storage devices mentioned above. Each of the modules described above corresponds to a set of commands for executing the function described above. The module described above or a program (that is, a set of commands) does not have to be implemented as a separate software program, procedure or module, and also, various subsets of these modules may be combined or reconstructed in various embodiments. In an embodiment, the memory 230 may store subsets of the modules described above and data structures. The memory 230 may further store additional modules and data structures not described above.

FIG. 3 shows "server", but rather than give a structural outline of the embodiment described in the present specification, FIG. 3 intends to describe various possible features of a set of the server. As would be recognized by those skilled in the art, in reality, items that are separately shown may be combined, or an item may be separated. For example, items that are separately shown in FIG. 3 may be implemented on a single server, or a single item may be implemented on one or more servers.

<Example of Data Structure>

FIG. 4 shows an example of keypoint data, according to the first embodiment, that is returned from the server 20 to the measurement module 134 of the information processing device 10. In the example shown in FIG. 4, the keypoint data includes, in association with a clothing item ID, a category, a keypoint 0, a keypoint 1, a keypoint 2 and so on, for example. The number of keypoints may be changed according to the category. Additionally, data of each keypoint includes coordinate data (u, v) in a camera image in the image coordinate system, and coordinate data (x, y, z) on the reference plane in the world coordinate system (three-dimensional coordinate system). As an example of the keypoint data, a clothing item ID "T-000100" is associated with a category "shirt", and coordinate data of each keypoint including the keypoint 0 "(u0, v0), (x0, y0, z0)". Additionally, the association relationship between the clothing item ID and the keypoint is not limited to the example in FIG. 4. For example, a two-dimensional coordinate group and a three-dimensional coordinate group of each keypoint may be separately stored and associated.

FIG. 5 is a diagram showing an example of size information of a clothing item included in the clothing item data 133 according to the first embodiment. In the example shown in FIG. 5, the size information includes, in association with the clothing item ID, the category and information about the size of the clothing item, such as the length, the chest width, the sleeve length and the like. Additionally, information about the size (the length, the chest width and the like) may be changed according to the category. As an example of the size information, the clothing item ID "T-000100" is associated with the category "shirt", the length "67.7 cm", the chest width "48.3 cm", the sleeve length "27.9 cm" and the like. Additionally, the unit of size is not limited to cm, and may be converted by the display control module 135 to various units such as inches. Additionally, the clothing item data 133 may include keypoint data linking a keypoint acquired by the measurement module 134 from the server 20 and the clothing item ID.

FIG. 6 is a diagram showing an example of the learned model 234 according to the first embodiment. In the example shown in FIG. 6, the learned models 234 are different on a per category basis, but such an example is not restrictive. For example, the learned model 234 may be generated as one model without being divided into categories. Additionally, dividing into categories enables accurate determination of each keypoint for measurement. In the learned model, a model and a representative keypoint are associated on a per category basis. For example, in relation to the representative keypoint, the position of the keypoint is associated with the clothing item. As an example of the learned model, position information of each keypoint such as the keypoint 0 (um0, vm0) is associated with the category "shirt" and the model "M1".

The data structure described above is merely an example, and is not restrictive. For example, a main key such as the clothing item ID may be changed to another ID, or image data may be associated with the clothing item data. Furthermore, in the case where the category is not specified, the category does not have to be stored.

<Specific Example>

Figure 7:
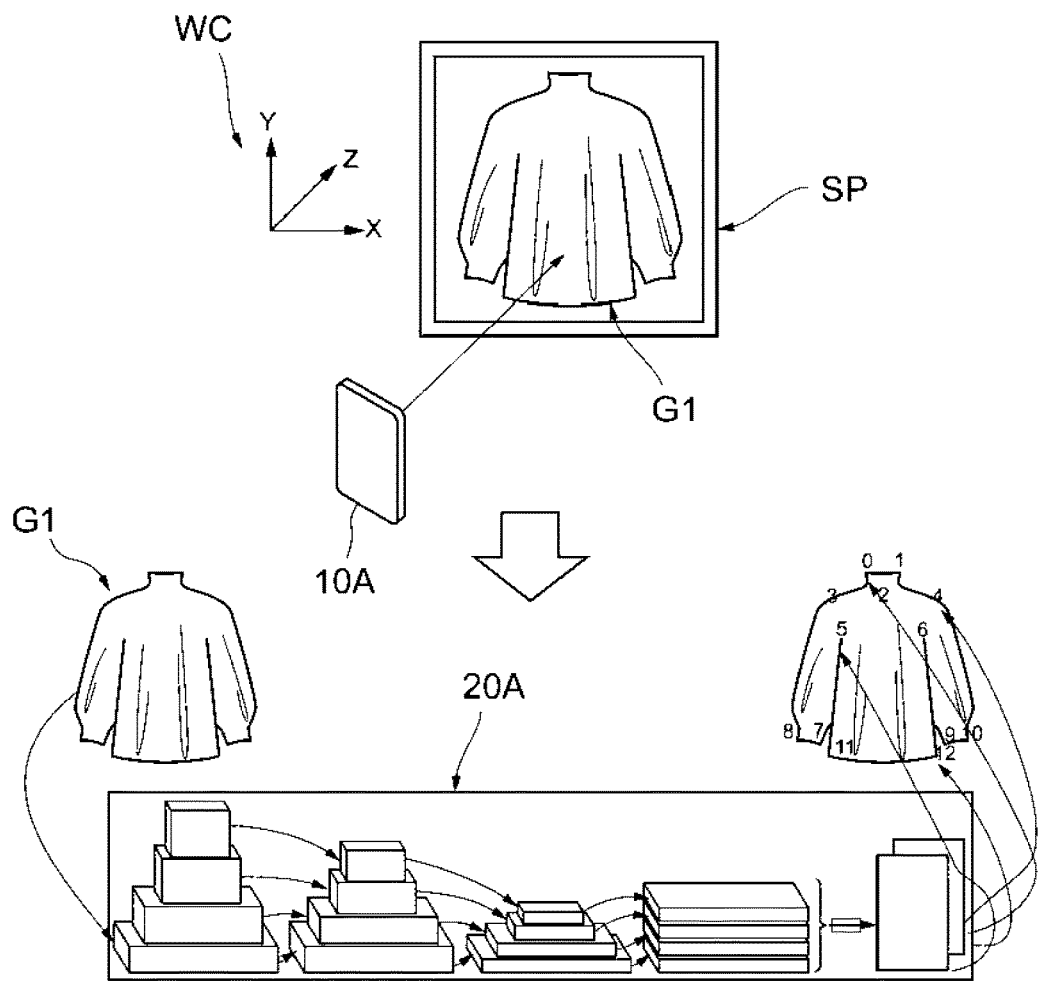
FIG. 7 is a diagram for describing a specific example in relation to a measurement process for a clothing item according to the first embodiment.

FIG. 7 is a diagram for describing a specific example in relation to a measurement process for a clothing item according to the first embodiment. A specific example of a measurement process will be described using the example shown in FIG. 7, in the order of a reference plane detection process, a keypoint calculation process, a three-dimensional coordinate specification process, and a size measurement process.

(Reference Plane Detection Process)

The measurement module 134 detects a feature group from a plurality of pieces of image data using a technique such as SLAM, for example. Then, the measurement module 134 specifies and detects a reference plane including the clothing item G1 based on the detected feature group. Here, the reference plane is described to be a flat plane, for example.

On the user terminal 10 side, generally, where the detected flat plane is in a world coordinate system WC, and a positional relationship between the flat plane and the position of the capturing device 160 of the user terminal 10 are detected. Here, it is difficult to determine on which plane the clothing item is. Accordingly, the measurement module 134 detects a plane which the capturing device 160 performing capturing is facing as the flat plane where the clothing item is present. Additionally, the reference plane may be a curved plane.

(Keypoint Calculation Process)

When the flat plane is detected, the measurement module 134 transmits one piece of image data being captured to the server 20. This piece of image data may be image data where the flat plane is detected, or may be one piece of image data being captured after detection of the flat plane. The learning module 235 of the server 20 takes, as input, the image data received from the user terminal 10 as new data, performs machine learning using the learned model 234, and outputs each keypoint of the clothing item in the image data.

For example, the learning module 235 may implement KeypointEstimationSubset in MultiPoseNet[1]. The learning module 235 thereby performs learning and transmits the coordinate data of each keypoint that is specified to the user terminal 10. For example, the learning module 235 acquires a flat plane in a camera image of the capturing device 160, and coordinate data of each keypoint on the flat plane in the two-dimensional image coordinate system. The learning module 235 transmits each piece of acquired coordinate data of each keypoint to the user terminal 10.

(Three-Dimensional Coordinate Specification Process)

The measurement module 134 of the user terminal 10 acquires, from the server 20, each piece of coordinate data included in the image data being captured. The measurement module 134 transforms the coordinate data of the keypoint in the image coordinate system into a three-dimensional point in the world coordinate system (three-dimensional coordinate system). For example, the measurement module 134 specifies, from a center position of the capturing device 160 and by using the coordinate data (u, v) in the image coordinate system, coordinate data (x, y, z) projected on the flat plane in the three-dimensional coordinate system where the clothing item G1 is present.

Specifically, the measurement module 134 performs projection from the camera position toward each keypoint in the image coordinate system, and plots a point where an extension line is impinged on the flat plane as a keypoint that is desired to be determined. At this time, the measurement module 134 determines coordinates in the three-dimensional coordinate system. Additionally, each keypoint is a keypoint provided at a position in relation to the size of a clothing item, and, for example, an outer end point of a sleeve, an outer end point of a collar, both end points of a hem, a seam of the shoulder, an edge and the like may be taken as keypoints.

(Size Measurement Process)

When a distance between two predetermined points is calculated, the measurement module 134 may acquire the size of the clothing item G1. For example, in the case of the long sleeve shirt G1 shown in FIG. 7, the measurement module 134 may measure the shoulder width by calculating the distance between the keypoints 3 and 4. Furthermore, the measurement module 134 may also measure the sleeve length (keypoints 3 and 8) and the like by calculating the distance between other two points. Control is performed such that each size that is measured is displayed in association with the clothing item included in the image data being captured.

<Description of Operation>

Figure 8:
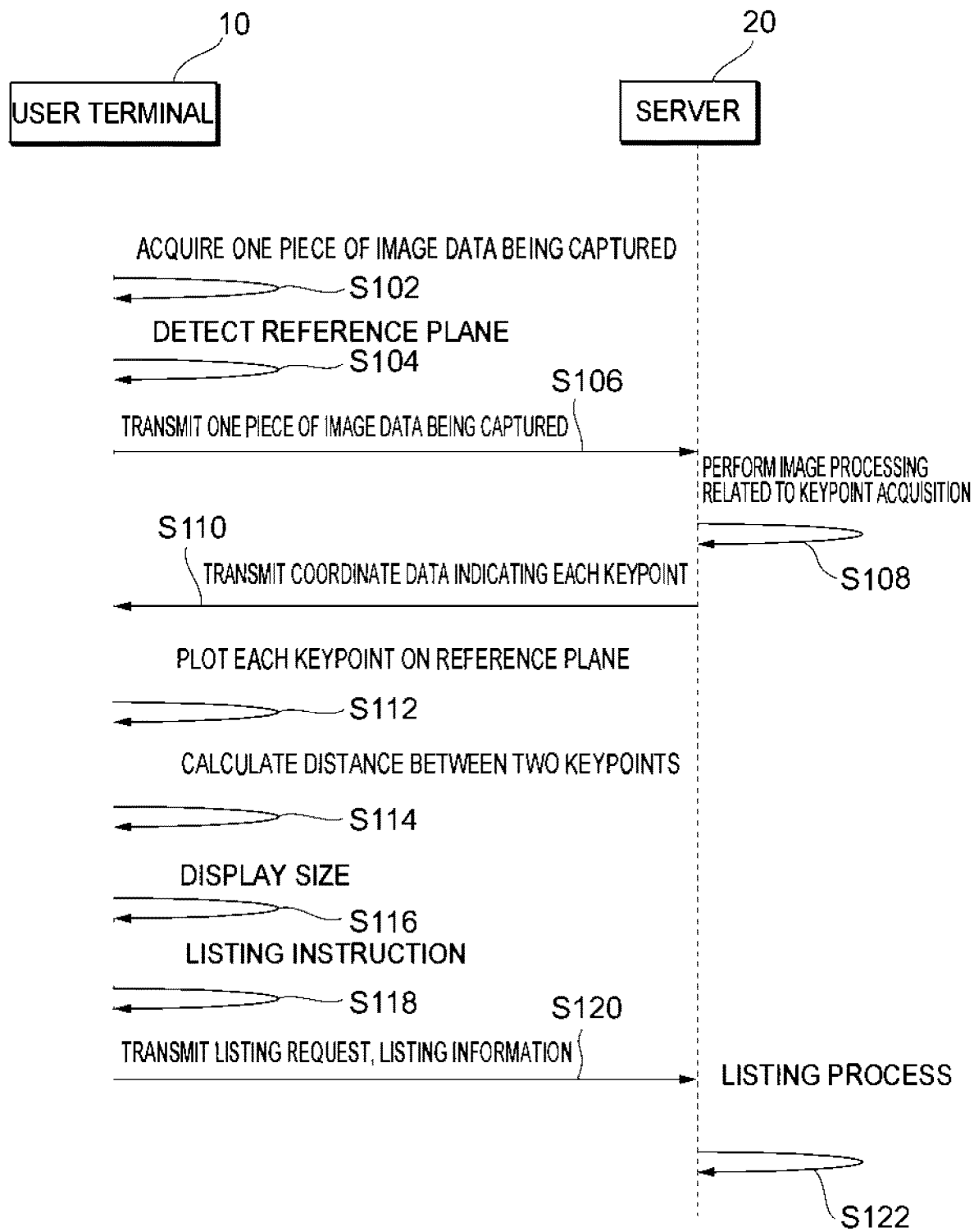
FIG. 8 is a sequence diagram showing an example of processing by the information processing system 1 according to the first embodiment.

Next, an operation of the information processing system 1 according to the first embodiment will be described. FIG. 8 is a sequence diagram showing an example of processing by the information processing system 1 according to the first embodiment.

(Step S102)

The measurement module 134 of the user terminal 10 acquires one piece of image data of a clothing item that is being captured. For example, the measurement module 134 may acquire the one piece of image data being captured, in response to an operation of pressing a button performed by a user.

(Step S104)

The measurement module 134 detects feature groups using a plurality of pieces of image data acquired, and detects a reference plane using the feature groups. A clothing item is assumed to be present on the reference plane.

(Step S106)

The measurement module 134 performs control such that one piece of image data being captured is transmitted to the server 20. The network communication module 132 thus transmits the one piece of image data to the server 20. The one piece of image data may be one of a plurality of pieces of image data for which the reference plane is detected, or may be one piece of image data that is captured within a predetermined period of time after the reference plane is detected.

(Step S108)

The learning module 235 of the server 20 performs image processing related to acquisition of keypoints. Here, the learning module 235 performs machine learning on the received image data by applying the learned model 234, and calculates, as an output, each keypoint related to the size of the clothing item included in the image data. Additionally, the image processing module 236 may perform the process related to acquisition of the keypoint described above, instead of the learning module 235.

(Step S110)

The learning module 235 performs control such that the coordinate data indicating each keypoint is transmitted to the user terminal 10. The network communication module 232 thus transmits each piece of coordinate data to the user terminal 10.

(Step S112)

The measurement module 134 of the user terminal 10 projects and plots the received coordinate data in the image coordinate system on the reference plane where the clothing item is, and acquires the plotted point as the coordinate data in the world coordinate system. Additionally, the measurement module 134 desirably plots the keypoint based on the three-dimensional position of the camera at the time of capturing of the image data that is transmitted to the server 20.

(Step S114)

The measurement module 134 calculates the distance between two keypoints. Additionally, the two points for which calculation is to be performed may be set in advance. For which two points calculation is to be performed may be set for each category of clothing item. This enables the measurement module 134 to easily grasp the two points for which the distance is to be determined, and to swiftly perform the processing.

(Step S116)

The display control module 135 performs control such that the calculated distance between two points is displayed on the image data being captured. For example, if the distance between two points indicates the shoulder width, the display control module 135 performs control such that the calculated distance is matched with the shoulder width in the image and displayed as the size information. By the size information being displayed effectively using AR, the size information may be notified to the user.

(Step S118)

The following processes are arbitrary processes, and do not necessarily have to be performed. It is assumed that the listing processing module 136 receives a listing instruction for the clothing item whose size information is displayed in AR, based on an operation by the user. For example, a screen where the size is displayed in AR includes a predetermined UI component such as a list button, and the user presses the UI component.

(Step S120)

The listing processing module 136 generates listing information by including, in the product information of the clothing item, the size information of the clothing item including the distance between two points calculated by the measurement module 134. Moreover, the generated listing information is transmitted to the server 20, together with a listing request.

(Step S122)

The electronic commerce module 237 of the server 20 performs various processes to sell the product for which the listing request is issued, on an electronic commerce platform.

As described above, with the technique of the present disclosure, a clothing item being captured may be appropriately measured without requiring a dedicated sheet of paper or the like. Furthermore, with the technique of the present disclosure, detection of a reference plane, transmission of image data, reception of each piece of coordinate data, plotting on the reference plane, size measurement, and display of the size in AR are performed by switching on the capturing device 160 and holding the capturing device 160 over a clothing item. In this case, in relation to each keypoint associated with the reference plane in the three-dimensional coordinate system, by performing detection of the reference plane on the user terminal 10 side, the distance between two keypoints in the three-dimensional coordinate system is not changed even if the position of the capturing device 160 is changed. Furthermore, because each keypoint is held in association with the three-dimensional coordinate system, even if a keypoint moves out of a field of view of the capturing device 160, the size that is based on the keypoint is displayed again in AR when the keypoint enters the field of view again. Additionally, if the information processing device 10 creates a virtual map and stores keypoint information in a coordinate system of the virtual map, the size can be calculated based on an extracted reference plane even if the keypoint moves out of the field of view of the camera after being acquired.

Figure 9:
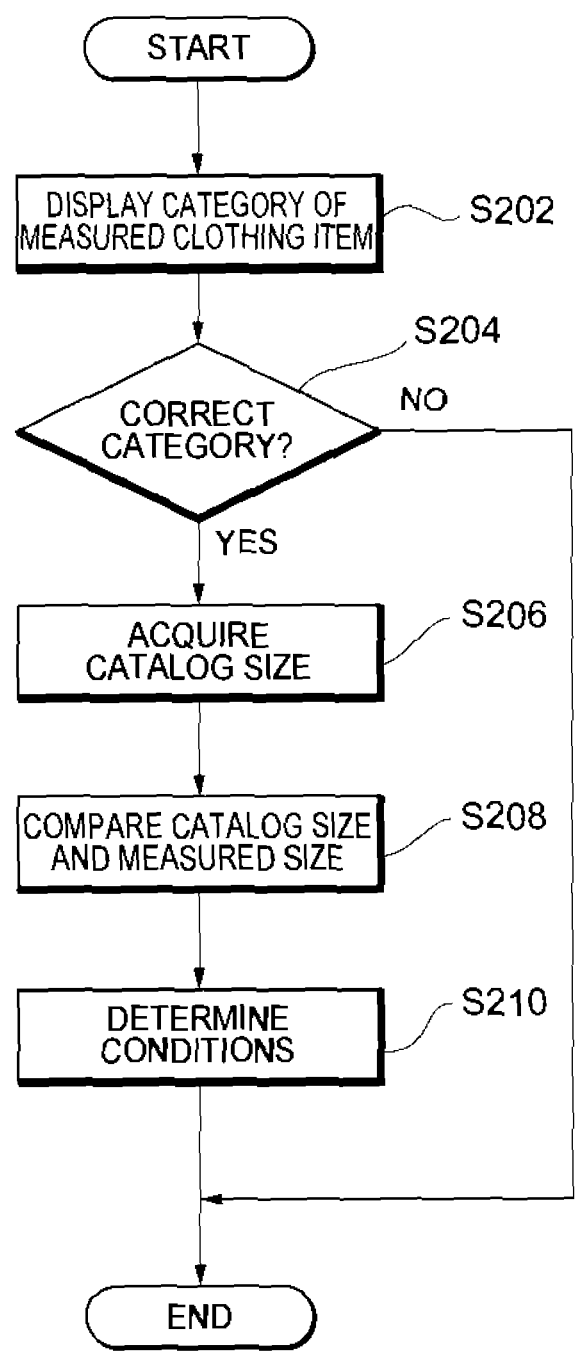
FIG. 9 is a flowchart showing an example of processing on the user terminal 10 side according to the first embodiment.

Next, processing on the user terminal 10 side will be described. FIG. 9 is a flowchart showing an example of processing on the user terminal 10 side according to the first embodiment.

(Step S202)

The display control module 135 performs control such that the category of a measured clothing item is displayed on a screen. For example, one of categories including T-shirt, trousers and skirt is displayed. The category may be specified by the server 20 by machine learning, or may be specified by similarity search for categories using image data.

(Step S204)

The measurement module 134 determines whether the displayed category is correct or not. For example, whether the category is correct or not may be determined according to a user operation on a button "YES" or "NO". If the category is determined to be correct (step S204: YES), the process proceeds to step S206, and if the category is determined to be not correct (step S204: NO), the process is ended. Additionally, a correction may be made by the user when the category is not correct.

(Step S206)

The measurement module 134 may acquire the catalog information of the product based on the category via a network, and may acquire the catalog size from the catalog information.

(Step S208)

The display control module 135 may perform control such that the acquired catalog size and the size information obtained by measurement (hereinafter referred to also as "measured size") are displayed on the screen in comparison with each other.

(Step S210)

The measurement module 134 determines conditions of the clothing item based on a comparison result of the catalog size and the measured size. Conditions of the clothing item are conditions that are determined based on the degree of difference between the catalog size and the measured size. For example, the conditions may include "good as new", "no noticeable stains", and the like, and the conditions will be described later with reference to FIGS. 11A to 11C.

The user terminal 10 according to the first embodiment may thus perform comparison with the catalog size, and determine conditions of the clothing item. For example, if the difference between the catalog size and the measured size is at or greater than a predetermined value, the conditions are "damaged or stained", and if the difference between the two sizes is at or smaller than a predetermined value, the conditions are "good as new".

<Example Screen>

Figure 10A:
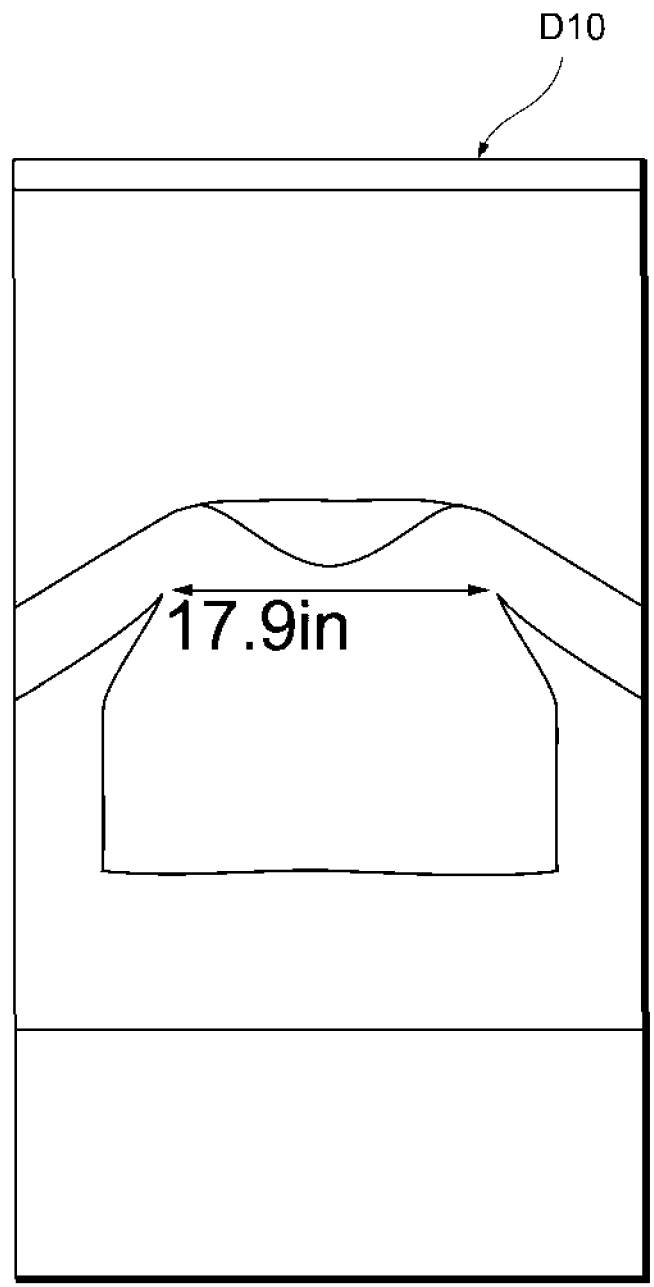
FIG. 10A is a diagram according to the first embodiment, showing an example where a long sleeve shirt that is flatly placed on a floor is being measured.

Next, an example of display on the screen of the user terminal 10 will be described. FIG. 10A is a diagram according to the first embodiment, showing an example where a long sleeve shirt that is flatly placed on a floor is being measured. As shown in FIG. 10A, each keypoint is superimposed and displayed on the clothing item in the image, and to which two points a distance corresponds is displayed on a screen D10. FIG. 10A shows an example where the chest width is displayed on the clothing item in inches.

Figure 10B:
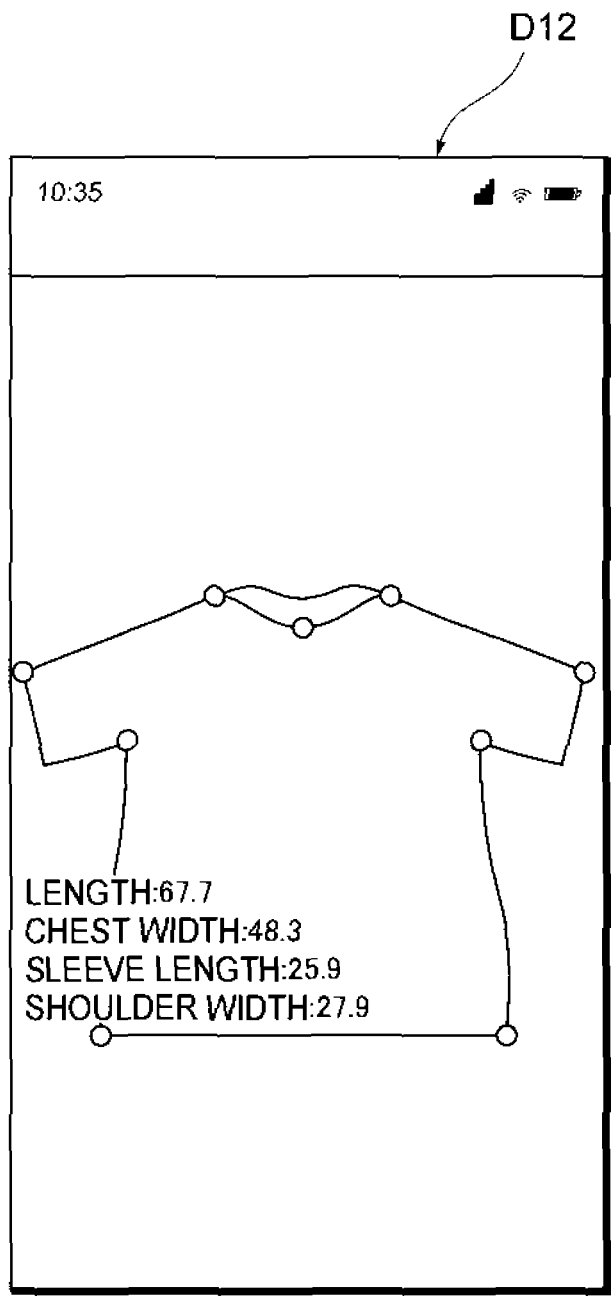
FIG. 10B is a diagram according to the first embodiment, showing an example where a short sleeve T-shirt that is flatly placed on a floor is being measured.

FIG. 10B is a diagram according to the first embodiment, showing an example where a short sleeve T-shirt that is flatly placed on a floor is being measured. As shown in FIG. 10B, a plurality of keypoints are matched on the clothing item in the image, and each size that is measured (length, chest width, sleeve length, shoulder width) is displayed at a lower left center (predetermined region) of a screen D12.

Figure 11A:
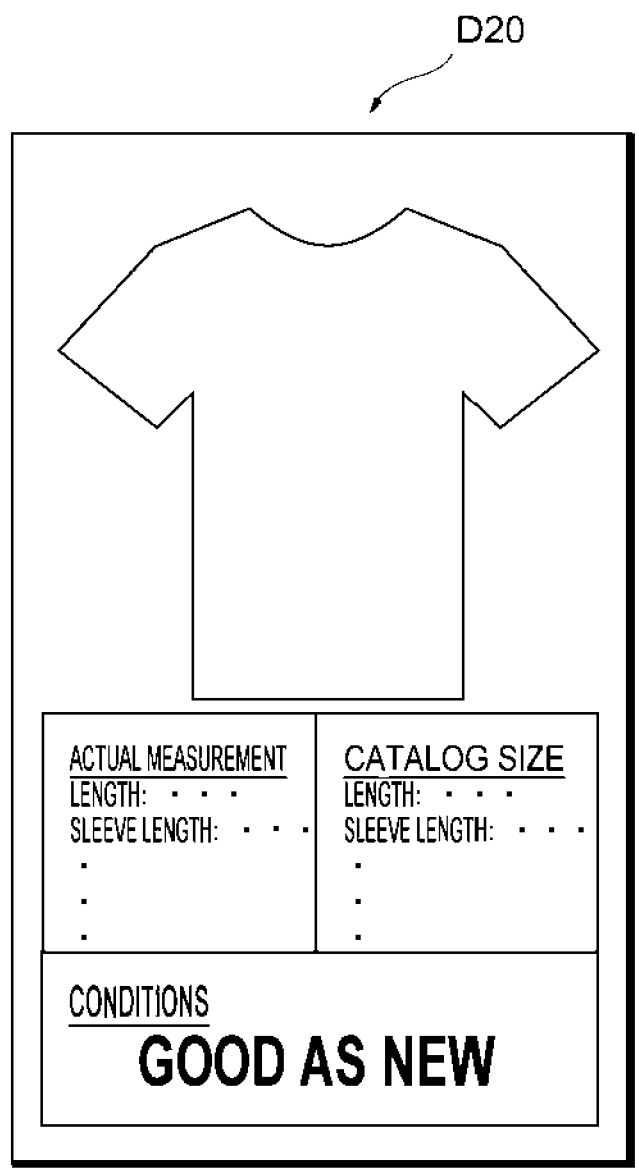
FIG. 11A is a diagram showing an example display A of a measurement result according to the first embodiment.

FIG. 11A is a diagram showing an example display A of a measurement result according to the first embodiment. In the example shown in FIG. 11A, the display control module 135 performs control such that measured sizes and catalog sizes are displayed in lists at a predetermined position (for example, a lower part) on a screen D20. In the example shown in FIG. 11A, the difference between the measured size and the catalog size is at or smaller than a first predetermined value for each item, and thus, conditions are determined to be "good as new".

Figure 11B:
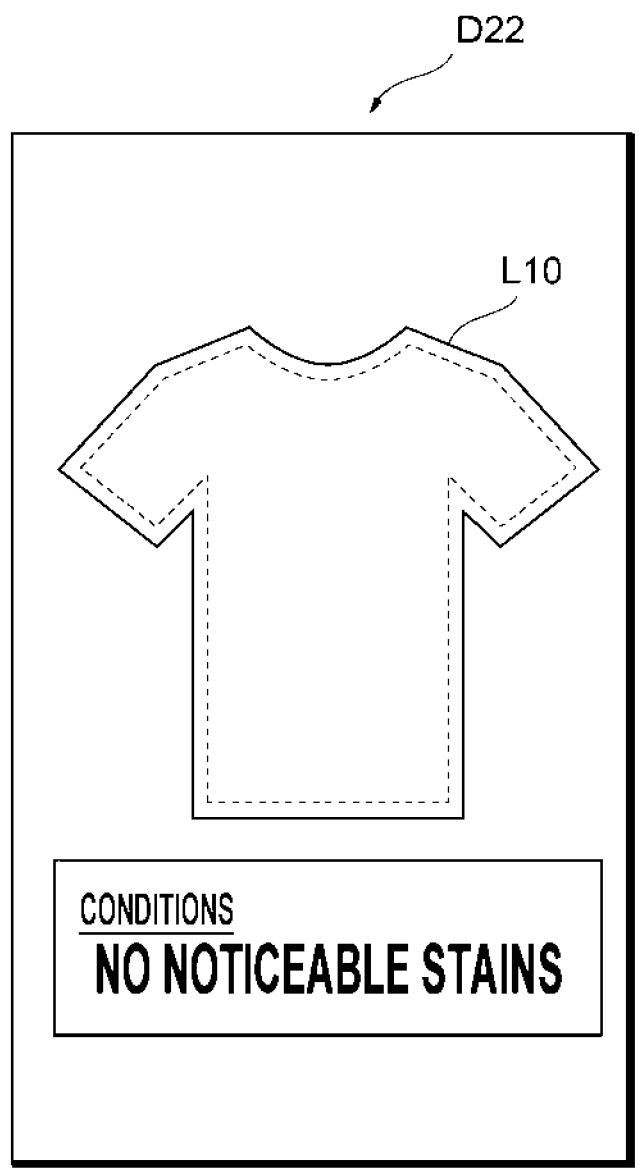
FIG. 11B is a diagram showing an example display B of the measurement result according to the first embodiment.

FIG. 11B is a diagram showing an example display B of the measurement result according to the first embodiment. In the example shown in FIG. 11B, the display control module 135 performs control such that the catalog size is displayed, on a screen D22, superimposed on the clothing item. In the example shown in FIG. 11B, the difference between the measured size and the catalog size is greater than a first predetermined value and smaller than a second predetermined value for each item, and thus, conditions are determined to be "no noticeable stains".

Figure 11C:
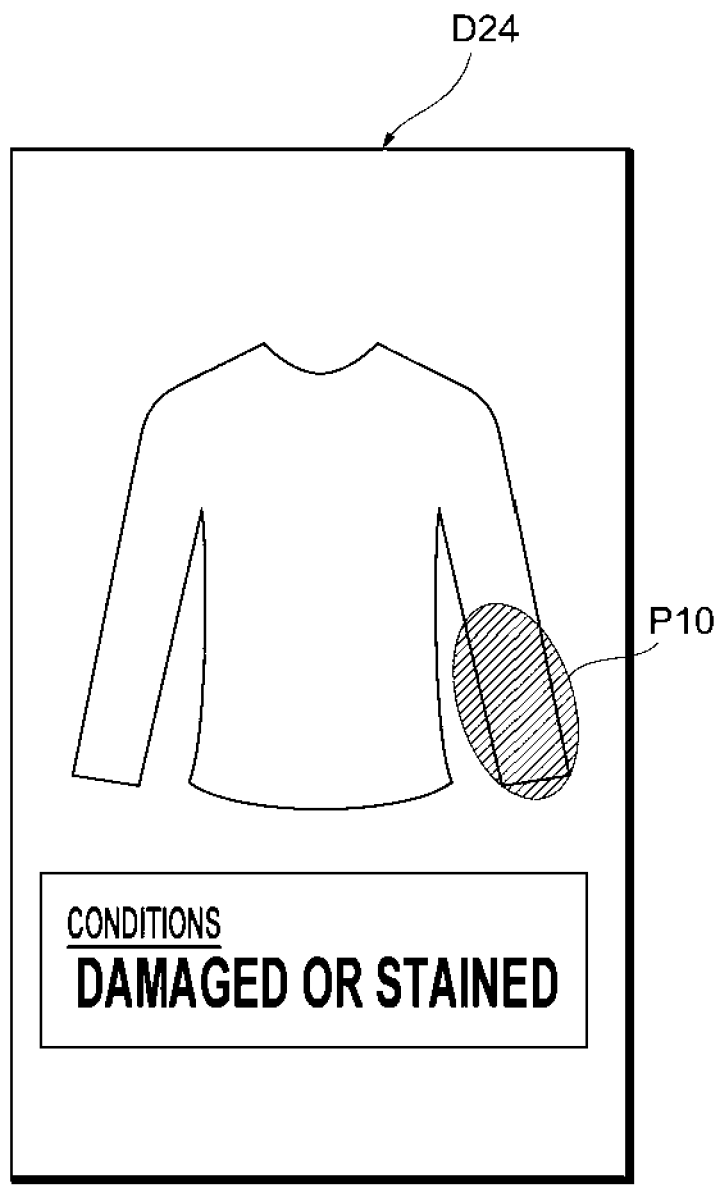
FIG. 11C is a diagram showing an example display C of the measurement result according to the first embodiment.

FIG. 11C is a diagram showing an example display C of the measurement result according to the first embodiment. In the example shown in FIG. 11C, the display control module 135 performs control such that a part P10 where the difference between the measured size and the catalog size is great is displayed in an emphasized manner on a screen D24. In the example shown in FIG. 11C, the difference between the measured size and the catalog size is greater than the second predetermined value for a certain item, and thus, the conditions are determined to be "damaged or stained".

Additionally, the manners of display of the measured size or the catalog size shown in FIGS. 11A to 11C are merely examples, and a plurality of types of display may be combined to be displayed. For example, the two sizes may be displayed in lists, and at the same time, if the difference between the measured size and the catalog size is great, the corresponding part may be displayed in an emphasized manner. Furthermore, the manner of display of a comparison result may be changed according to the difference between the measured size and the catalog size.

For example, the screen D20 shown in FIG. 11A may be displayed when the difference is smaller than the first predetermined value.

Second Embodiment

Next, a system according to a second embodiment will be described. In the second embodiment, image processing by the server 20 according to the first embodiment is performed by the user terminal 10. Advantageous effects the same as those of the first embodiment may thus be achieved by only the user terminal 10.
<System Configuration, Etc.>

A system configuration, a configuration of a control device, and the like according to the second embodiment are basically the same as the system configuration, the configuration of a control device, and the like according to the first embodiment. The second embodiment is different from the first embodiment in that the learning module 235 and/or the image processing module 236 are provided in the user terminal 10.

The user terminal 10 may thus perform the same processing as that of the first embodiment by itself, and a time from acquisition of image data being captured and display of the size may be reduced regardless of the state of communication, and real-time property can be improved.

Additionally, the disclosed technique is not limited to the embodiments described above, and may be embodied in various manners within the scope of the disclosed technique. The embodiments are exemplary in all aspects, and should not be interpreted limitedly. For example, the processing steps described above may be arbitrarily performed in different orders or in parallel so long as no conflict occurs in processing contents.

A program of each embodiment of the present disclosure may be provided being stored in a computer-readable storage medium. The storage medium is "non-transitory tangible medium" capable of storing programs. Programs include, but are not limited to, software programs and computer programs.

EXAMPLE MODIFICATIONS

Example modifications of each embodiment described above will be described below.

Example Modification 1

In each of the embodiments described above, an example is described where a clothing item is taken as the target of measurement, but such an example is not restrictive, as described in Example Modification 1. Target objects of measurement may be any objects as long as the objects can be placed within the field of view of the capturing device 160, and the objects include furniture, accessories, stationery, electronic appliances, daily use articles, and vehicles, for example. Keypoints are set in the learned model 234 according to each object. Additionally, a system configuration and the like of Example Modification 1 are the same as those of the first embodiment.

Furthermore, in the case of an object whose size does not change from the catalog size, the measurement module 134 may stop issuance of an acquisition request for the catalog information. Settings may be performed in advance about an object for which the catalog information is to be acquired and an object for which the catalog information is not to be acquired, and the measurement module 134 may acquire the catalog information only for an object for which the catalog information may be acquired, and the display control module 135 may perform control such that the catalog size and the measured size are displayed on the screen. In this manner, the catalog information may be acquired for an object whose size is possibly changed by use, such as a clothing item or shoes, without requiring the catalog information to be acquired for an object whose size is not changed by use.

Example Modification 2

In each of the embodiments described above, an example is described where a size that is measured in the embodiment is taken as the target that is compared against a catalog, but such an example is not restrictive, as described in Example Modification 2. For example, the display control module 135 may perform control such that a size that is measured using a conventional technique and a size acquired from the catalog information are displayed on the screen in comparison with each other. Furthermore, the size that is taken as the target that is compared with the catalog size is not limited to a size that is automatically calculated, and may be a size that is manually input, and the display control module 135 may perform control such that the two are displayed on the screen in comparison with each other. When these pieces of information are included in the listing information, a buyer may perform determination regarding purchase based on comparison against the catalog size.

Example Modification 3

In Example Modification 3, in a case where an object is shown while the capturing device 160 is moved in an ON state, the memory 130 acquires, and buffers for a predetermined period of time, image data at a time point of object recognition and information about the camera at the time point (a three-dimensional position, a rotation angle, coordinates and the like of the camera). Processes described in each embodiment may thus be performed using image data that is buffered at around the time point of object detection.

Example Modification 4

In Example Modification 4, the body size of a user may be registered in advance in an electronic commerce platform, and the display control module 135 may perform control such that a clothing item matching the body size of the user, among clothing items of the sizes measured in each of the embodiments and example modifications described above, is specified and displayed. A clothing item of a size matching the user may thus be proposed to the user.

Example Modification 5

In each of the embodiments described above, detection of the reference plane is performed on the user terminal 10 side, but in Example Modification 5, the image data and the data in the world coordinate system may be transmitted to the server 20 side, and the size of an object may be measured on the server 20 side, and the size may be displayed by the user terminal 10.

CROSS-REFERENCE TO RELATED APPLICATION

The present application is based on Japanese Patent Application No. 2019-142241 filed on Aug. 1, 2019, the entire contents of which are incorporated herein by reference.

What is claimed is:

1. An information processing method that is performed by one or more processors included in an information processing device, the method comprising:
    acquiring, from a memory, image data including a clothing item being captured;
    detecting a reference plane in a three-dimensional coordinate system, wherein the clothing item is to be present on the reference plane, and wherein the detecting the reference plane includes detecting, using a localization-and-mapping technique, a plurality of features from the image data;
    transmitting the image data to an other information processing device;
    acquiring, from the other information processing device, each piece of coordinate data, in an image coordinate system, indicating each measured point regarding a size of the clothing item included in the image data, the coordinate data being obtained as a result of image processing on the image data;
    projecting and plotting, on the reference plane, each measured point indicated by each piece of coordinate data in the image coordinate system;
    calculating, in relation to each measured point in the three-dimensional coordinate system plotted on the reference plane, a distance between predetermined two points, the distance indicating the size of the clothing item; and
    performing control such that the distance between the predetermined two points that is calculated is displayed on the image data being captured.

2. The information processing method according to claim 1, wherein
    the one or more processors further perform
        acquiring specific information about the clothing item included in the image data, and
        acquiring catalog information of the clothing item based on the specific information, and
    the performing control includes performing control such that a size in the catalog information and the size indicated by the distance that is calculated are displayed in the image data.

3. The information processing method according to claim 2, wherein the performing control includes performing control such that the size in the catalog information and the size indicated by the distance are displayed in the image in comparison with each other.

4. The information processing method according to claim 2, wherein the performing control includes performing control such that the size in the catalog information and the size indicated by the distance are displayed superimposed on the clothing item in the image.

5. The information processing method according to claim 2, wherein the performing control includes performing control such that, in a case where the size in the catalog information and the size indicated by the distance are different by a predetermined value or more at a predetermined part of the clothing item, the predetermined part is displayed on the image data in an emphasized manner.

6. The information processing method according to claim 1, wherein
    the detecting includes detecting, in a case where a plurality of clothing items are included in the image data, a reference plane including the plurality of clothing items,
    the acquiring each piece of coordinate data includes acquiring, for each clothing item, each measured point regarding a size of the clothing item,
    the plotting includes projecting and plotting, on the reference plane, for each clothing item, each measured point indicated by each piece of coordinate data of the clothing item in the image coordinate system,
    the calculating includes calculating, for each clothing item, a distance between predetermined two points indicating a size of the clothing item, in relation to each measured point in the three-dimensional coordinate system that is plotted, and
    the performing control includes performing control such that the distance between the predetermined two points that is calculated is displayed, for each clothing item, on the image data being captured.

7. The information processing method according to claim 1, wherein the one or more processors further generate listing information by including, in product information of the clothing item, size information of the clothing item including the distance between the two points that is calculated.

8. The information processing method according to claim 1, wherein the acquiring each piece of coordinate data includes acquiring, by the other information processing device, each piece of coordinate data, in the image coordinate system, indicating each measured point that is generated through machine learning performed using a learned model and the image data that is acquired, each measured point being generated in relation to the image data, the learned model being learned taking image data including the clothing item as learning data and each measured point regarding a size of the clothing item as a ground truth label.

9. A computer-readable non-transitory storage medium storing a program for causing one or more processors included in an information processing device to perform:
- acquiring, from a memory, image data including a clothing item being captured;
- detecting a reference plane in a three-dimensional coordinate system, wherein the clothing item is to be present on the reference plane, wherein the detecting the reference plane includes detecting, using a localization-and-mapping technique, a plurality of features from the image data;
- transmitting the image data to an other information processing device;
- acquiring, from the other information processing device, each piece of coordinate data, in an image coordinate system, indicating each measured point regarding a size of the clothing item included in the image data, the coordinate data being obtained as a result of image processing on the image data;
- projecting and plotting, on the reference plane, each measured point indicated by each piece of coordinate data in the image coordinate system;
- calculating, in relation to each measured point in the three-dimensional coordinate system plotted on the reference plane, a distance between predetermined two points, the distance indicating the size of the clothing item; and
- performing control such that the distance between the predetermined two points that is calculated is displayed on the image data being captured.

10. An information processing device including a memory and one or more processors, wherein the one or more processors perform:
- acquiring, from the memory, image data including a clothing item being captured;
- detecting a reference plane in a three-dimensional coordinate system, wherein the clothing item is to be present on the reference plane, wherein the detecting the reference plane includes detecting, using a localization-and-mapping technique, a plurality of features from the image data;
- transmitting the image data to an other information processing device;
- acquiring, from the other information processing device, each piece of coordinate data, in an image coordinate system, indicating each measured point regarding a size of the clothing item included in the image data, the coordinate data being obtained as a result of image processing on the image data;
- projecting and plotting, on the reference plane, each measured point indicated by each piece of coordinate data in the image coordinate system;
- calculating, in relation to each measured point in the three-dimensional coordinate system plotted on the reference plane, a distance between predetermined two points, the distance indicating the size of the clothing item; and
- performing control such that the distance between the predetermined two points that is calculated is displayed on the image data being captured.

11. The information processing method according to claim 1, wherein a learning module takes the image data as input, and outputs a plurality of keypoints of the clothing item in the image data.

12. The computer-readable non-transitory storage medium according to claim 9, wherein a learning module takes the image data as input, and outputs a plurality of keypoints of the clothing item in the image data.

13. The information processing device according to claim 10, wherein a learning module takes the image data as input, and outputs a plurality of keypoints of the clothing item in the image data.

* * * * *